United States Patent
Long et al.

(10) Patent No.: US 10,855,163 B2
(45) Date of Patent: Dec. 1, 2020

(54) SUPPLY METHOD OF DUAL-CHIP POWER CIRCUIT AND DUAL-CHIP POWER CIRCUIT

(71) Applicant: Joulwatt Technology (Hangzhou) Co., LTD., Hangzhou (CN)

(72) Inventors: Hao Long, Hangzhou (CN); Xunwei Zhou, Hangzhou (CN)

(73) Assignee: JOULWATT TECHNOLOGY (HANGZHOU) CO., LTD., Hangzhou (CN)

( * ) Notice: Subject to any disclaimer, the term of this patent is extended or adjusted under 35 U.S.C. 154(b) by 0 days.

(21) Appl. No.: 16/847,694

(22) Filed: Apr. 14, 2020

(65) Prior Publication Data

US 2020/0336060 A1    Oct. 22, 2020

(30) Foreign Application Priority Data

Apr. 16, 2019   (CN) .......................... 2019 1 0306335

(51) Int. Cl.
    *H02M 1/08*    (2006.01)
    *H02M 3/156*   (2006.01)
    *H02M 1/32*    (2007.01)

(52) U.S. Cl.
    CPC ............ *H02M 1/08* (2013.01); *H02M 1/32* (2013.01); *H02M 3/156* (2013.01)

(58) Field of Classification Search
    CPC ........... H02M 1/08; H02M 3/156; H02M 1/32
    USPC ........................................................ 327/547
    See application file for complete search history.

(56) References Cited

U.S. PATENT DOCUMENTS

| | | | | |
|---|---|---|---|---|
| 7,598,715 | B1* | 10/2009 | Hariman | H02M 3/1588 323/222 |
| 2011/0156675 | A1* | 6/2011 | Matthews | H02M 3/155 323/282 |
| 2013/0124591 | A1* | 5/2013 | Buch | G06F 7/588 708/251 |
| 2013/0127371 | A1* | 5/2013 | Sarig | H02M 1/08 315/307 |
| 2013/0140896 | A1* | 6/2013 | Tzinker | H02M 3/156 307/43 |
| 2014/0015503 | A1* | 1/2014 | Cheng | H02M 3/1588 323/282 |
| 2014/0254214 | A1* | 9/2014 | Balakrishnan | H02M 3/33523 363/21.15 |
| 2015/0188434 | A1* | 7/2015 | Ouyang | H02M 3/158 323/267 |

(Continued)

*Primary Examiner* — Ryan Jager
(74) *Attorney, Agent, or Firm* — Bayramoglu Law Offices LLC

(57) ABSTRACT

A supply method of a dual-chip power circuit, and a dual-chip power circuit are provided. The dual-chip power circuit includes an inductor, a conduction element, a first chip and a second chip. The first chip includes a control circuit and a supply circuit. The second chip includes a first switch and a drive control circuit, and the drive control circuit is connected to a control end of the first switch. The supply method includes the following steps. When starting, the drive control circuit controls the power circuit to operate in an open-loop state; and if the output voltage of the supply circuit is detected to be established, the supply circuit supplies power to the control circuit, the drive control circuit of the second chip receives an output voltage of the first chip, and then the power circuit operates in a closed-loop state.

9 Claims, 4 Drawing Sheets

(56) References Cited

U.S. PATENT DOCUMENTS

| | | | |
|---|---|---|---|
| 2017/0034887 A1* | 2/2017 | Ichikawa | B60Q 1/04 |
| 2017/0040883 A1* | 2/2017 | Hu | H02M 3/156 |
| 2018/0034365 A1* | 2/2018 | Sicard | H02M 1/08 |
| 2019/0149046 A1* | 5/2019 | Chen | H02M 3/156 |
| | | | 323/271 |

\* cited by examiner

SUPPLY METHOD OF DUAL-CHIP POWER CIRCUIT AND DUAL-CHIP POWER CIRCUIT

CROSS REFERENCE TO THE RELATED APPLICATIONS

This application is based upon and claims priority to Chinese Patent Application No. 201910306335.9, filed on Apr. 16, 2019, the entire contents of which are incorporated herein by reference.

TECHNICAL FIELD

The present invention relates to the technical field of power electronics, and more particularly to a supply method of a dual-chip power circuit and a dual-chip power circuit.

BACKGROUND

In a high-voltage process, only the drain end of a metal-oxide-semiconductor (MOS) transistor can withstand the high voltage (about 700 V), while the other ends of the MOS transistor and other devices can only withstand the low voltage (less than 50 V). FIG. 1 shows a buck circuit, where a chip made through a high-voltage process shown in the dotted frame includes a MOS transistor Q1 and a drive control circuit. In FIG. 1, the switch node SW is the reference ground GND of the chip. The drive control circuit samples the output voltage Vo by the output divider composed of resistors R1 and R2. When the freewheel diode D1 is turned off and the MOS transistor Q1 is turned on, the voltage at the SW is equal to the input voltage, and the voltage sampled on the feedback voltage FB is equal to the difference between the output voltage and the input voltage. Only when the freewheel diode D1 is turned on and the MOS transistor Q1 is turned off, the voltage at the SW is equal to the low potential of the output voltage, and the voltage sampled on the feedback voltage FB is the output voltage. Therefore, when the output load current changes when the MOS transistor Q1 is turned on, the drive control circuit cannot detect the change of the output voltage. Only after the MOS transistor Q1 is turned off again, the drive control circuit can detect the change and adjust the output voltage Vo to the set voltage value. It is impossible to respond to the change of the output voltage quickly via this method. Especially when the working frequency in light load/no load is very low, the turn-off interval of Q1 is very long, and the adjustment speed of the change of the output voltage caused by the load current jump is relatively slow. Therefore, the dual-chip power circuit shown in FIG. 2 is used to improve the adjustment speed of the change of the output voltage caused by the load current jump. The dual-chip power circuit includes the first chip 100 and the second chip 200. The second chip 200 receives the output voltage of the first chip, thereby controlling the turn-on and turn-off of the switch Q210. The first chip 100 further includes the supply circuit 120, and the supply circuit 120 supplies power to the control circuit 110. When the output voltage of the power circuit is not established, the input voltage of the power circuit supplies power to the control circuit through the supply circuit. When the output voltage is established, the output voltage of the power circuit supplies power to the control circuit through the supply circuit. Since the supply circuit is connected to the input end of the power circuit, the first chip is equipped with a high-voltage power extraction module connected to the input end of the power circuit. In general, the input voltage of the power circuit is the high voltage. In order to meet a certain withstand voltage and be safe and reliable, the high-voltage power extraction module has to occupy a certain design space and requires extra attention to safety and reliability, which results in increased difficulty and complexity to the design of the whole scheme. Meanwhile, the high-voltage power extraction module will occupy a large area of the first chip, which increases the cost of the system.

SUMMARY

In view of this, an objective of the present invention is to provide a dual-chip power circuit with a high-voltage process, so as to solve the problem of the increased complexity and cost of the system due to the high-voltage power extraction module that is required by the first chip in the prior art.

The technical solution of the present invention is to provide a supply method of a dual-chip power circuit. The dual-chip power circuit includes an inductor, a conduction element, a first chip and a second chip. The first chip includes a control circuit and a supply circuit. The second chip includes a first switch and a drive control circuit, and the drive control circuit is connected to the control end of the first switch. A low voltage end of an output end of the power circuit is a reference ground of the control circuit of the first chip. The common end of the inductor and the conduction element is a reference ground of the drive control circuit of the second chip. The supply method includes the following steps:

S001: starting by controlling the power circuit by the drive control circuit to operate in an open-loop state;

S002: detecting whether an output voltage of the supply circuit is greater than a first threshold; if the output voltage of the supply circuit is less than the first threshold, returning to step S001; if the output voltage of the supply circuit is greater than or equal to the first threshold, proceeding to step S003; and S003: when the output voltage of the supply circuit is greater than or equal to the first threshold, supplying power to the control circuit by the supply circuit, receiving an output voltage of the first chip by the drive control circuit of the second chip, and the power circuit operating in a closed-loop state.

Optionally, the output end of the power circuit supplies power to the control circuit through the supply circuit.

Optionally, in step S001, the power circuit operates at a maximum operating frequency or a limited operating frequency or a limited peak inductor current.

Optionally, in step S003, when the output voltage of the supply circuit is greater than the first threshold, the control circuit of the first chip sends a signal indicating an establishment of the output voltage of the supply circuit to the drive control circuit of the second chip. After receiving the signal indicating the establishment of the output voltage of the supply circuit, the drive control circuit begins to be controlled by the control circuit of the first chip.

Optionally, in step S002, when the power circuit operates in the open-loop state for a longer time than a first time, or in step S003, when the power circuit operates in the closed-loop state, the output voltage of the supply circuit is lower than a second threshold, and the drive control circuit controls the power circuit to operate in a protection state. When the output voltage of the supply circuit is greater than the first threshold, the power circuit exits the protection state and then enters the closed-loop state.

Optionally, the protection state is that a switching frequency of the power circuit is lower than a first switching frequency or the power circuit stops switching for a second time, operates for a third time in the open-loop state, stops switching for the second time circularly.

The present invention further provides a dual-chip power circuit. The dual-chip power circuit includes an inductor, a conduction element, a first chip and a second chip. The first chip includes a control circuit and a supply circuit. The second chip includes a first switch and a drive control circuit, and the drive control circuit is connected to the control end of the first switch. The low voltage end of an output end of the power circuit is a reference ground of the control circuit of the first chip. The common end of the inductor and the conduction element is a reference ground of the drive control circuit of the second chip. When starting, the drive control circuit controls the power circuit to operate in an open-loop state, and when an output voltage of the supply circuit is greater than a first threshold, the supply circuit supplies power to the control circuit, the control circuit of the first chip receives a feedback signal, the drive control circuit of the second chip receives an output voltage of the first chip, and then the power circuit operates in a closed-loop state.

Optionally, the output end of the power circuit supplies power to the control circuit through the supply circuit.

Optionally, when the output voltage of the supply circuit is greater than the first threshold, the control circuit of the first chip sends a signal indicating an establishment of the output voltage of the supply circuit to the drive control circuit of the second chip. After receiving the signal indicating the establishment of the output voltage of the supply circuit, the drive control circuit begins to be controlled by the control circuit of the first chip.

Optionally, the first chip receives the feedback signal, and the feedback signal indicates an output voltage, an output current, an output power, an input voltage, an input current or an input power.

Optionally, the power circuit is a buck-boost circuit. The input end of the power circuit is connected to the first end of the first switch of the second chip. The second end of the first switch of the second chip is connected to the common end of the inductor and the conduction element. The inductor is connected to the low voltage end of the input end of the power circuit. The first end of the conduction element is connected to the output end of the power circuit, and the second end of the conduction element is connected to the inductor.

Alternatively, the power circuit is a buck circuit. The input end of the power circuit is connected to the first end of the first switch of the second chip. The second end of the first switch of the second chip is connected to the common end of the inductor and the conduction element. The inductor is connected to the output end of the power circuit. The first end of the conduction element is connected to the low voltage end of the input end of the power circuit, and the second end of the conduction element is connected to the inductor.

Compared with the prior art, the circuit structure of the present invention has the following advantages: the first chip does not need a high-voltage power extraction module, which simplifies the design of the system and reduces the cost of the system.

DETAILED DESCRIPTION OF THE EMBODIMENTS

Figure 1:
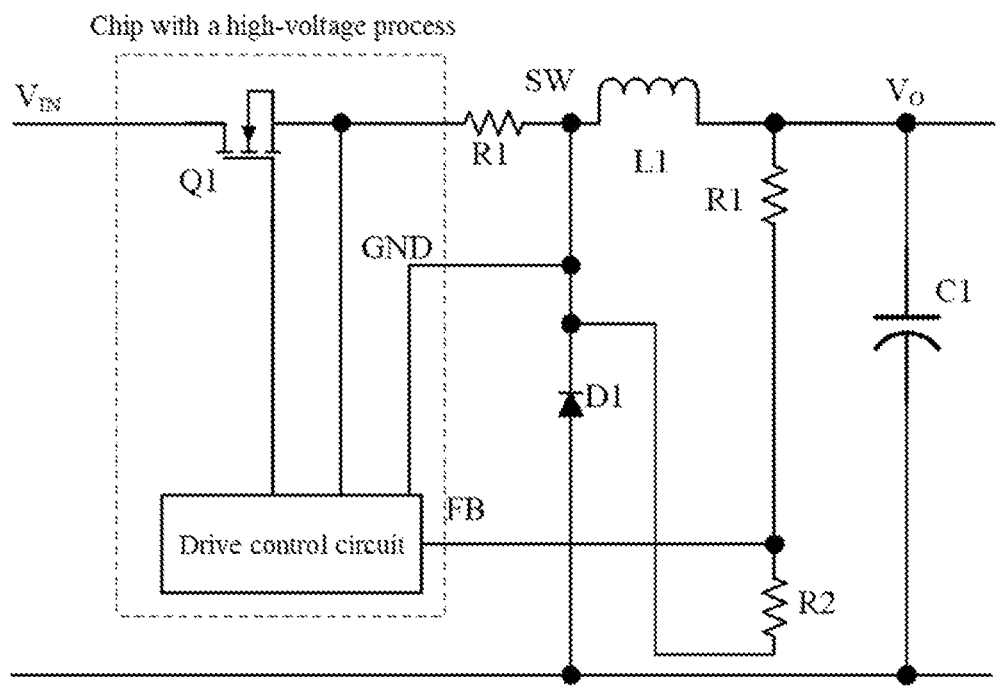
FIG. 1 is a schematic diagram of a buck circuit using a chip with a traditional high-voltage process.
Figure 2:
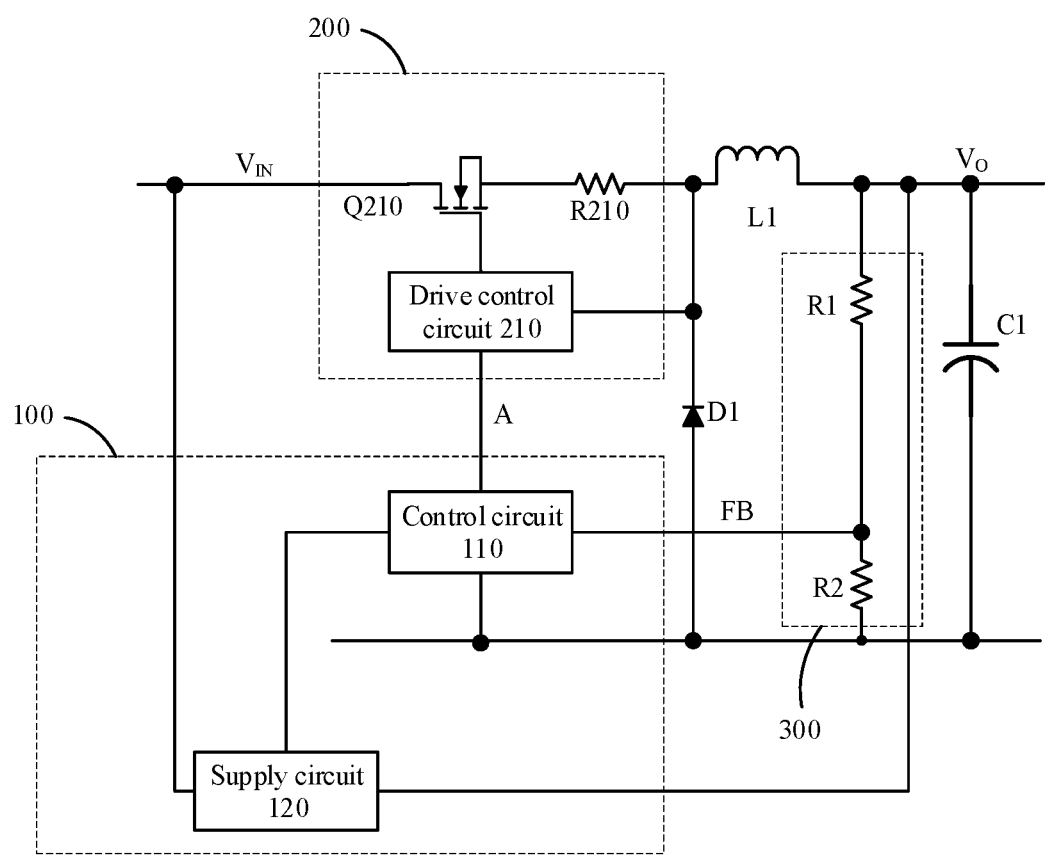
FIG. 2 is a schematic diagram of a dual-chip buck circuit using a traditional supply method.

Hereinafter, preferred embodiments of the present invention are described in detail with reference to the drawings, but the present invention is not merely limited to these embodiments. The present invention covers any substitutions, modifications, equivalent methods, and solutions made within the spirit and scope of the present invention.

In order to provide the public a thorough understanding of the present invention, specific details are described in the following preferred embodiments of the present invention, and those skilled in the art can fully understand the present invention without the description of these details.

The present invention is described in more detail by way of embodiment in the following paragraphs with reference to the drawings. It should be noted that each of the drawings are in a simplified form and use inaccurate proportions, and are only used to facilitate and clearly assist the description of the embodiments of the present invention.

The present invention provides a supply method of a dual-chip power circuit. The dual-chip power circuit includes the inductor L1, the conduction element, the first chip 100 and the second chip 200. The first chip 100 includes the control circuit 110 and the supply circuit 120. The second chip 200 includes the first switch Q210 and the drive control circuit 210, and the drive control circuit 210 is connected to the control end of the first switch Q210. The low voltage end GND of the output end of the power circuit is the reference ground of the control circuit of the first chip. The common end of the inductor and the conduction element is the reference ground of the drive control circuit of the second chip. The supply method includes the following steps.

S001: when starting, the drive control circuit 210 controls the power circuit to operate in an open-loop state.

S002: the output voltage of the supply circuit 120 is detected whether to be greater than a first threshold. If the output voltage of the supply circuit 120 is less than the first threshold, return to step S001; if the output voltage of the supply circuit 120 is greater than or equal to the first threshold, proceed to step S003.

S003: when the output voltage of the supply circuit 120 is greater than or equal to the first threshold, the supply circuit 120 supplies power to the control circuit 110, the drive control circuit 210 of the second chip receives the output voltage of the first chip 100, and the power circuit operates in a closed-loop state.

In the high-voltage process, only the drain end of the MOS transistor can withstand the high voltage (about 700 V), while the other ends of the MOS transistor and other devices can only withstand the low voltage (less than 50 V), so the above dual-chip power circuit is particularly suitable for application in the high-voltage process. However, the dual-chip power circuit is not limited to a high-voltage process, but also can be applied to other processes, such as bipolar complementary metal-oxide-semiconductor double-diffusion metal-oxide-semiconductor (BCD) process. Alternatively, the first chip adopts the low-voltage process, and the second chip adopts the BCD process or the high-voltage process and so on. In the present embodiment, the first chip includes the first switch Q210, and in another embodiment, the first chip does not include the first switch Q210. Therefore, when packaging, it may be necessary to package three chips, that is the first chip, the second chip and the first switch, into one package. Hence, the term "dual-chip" described in the present invention is not limited to the meaning that there are two chips in one package, but that there may be more than two chips in one package. Sometimes, the first chip is referred as the first wafer and the second chip is referred as the second wafer, so as to indicate the state before packaging.

Figure 3:
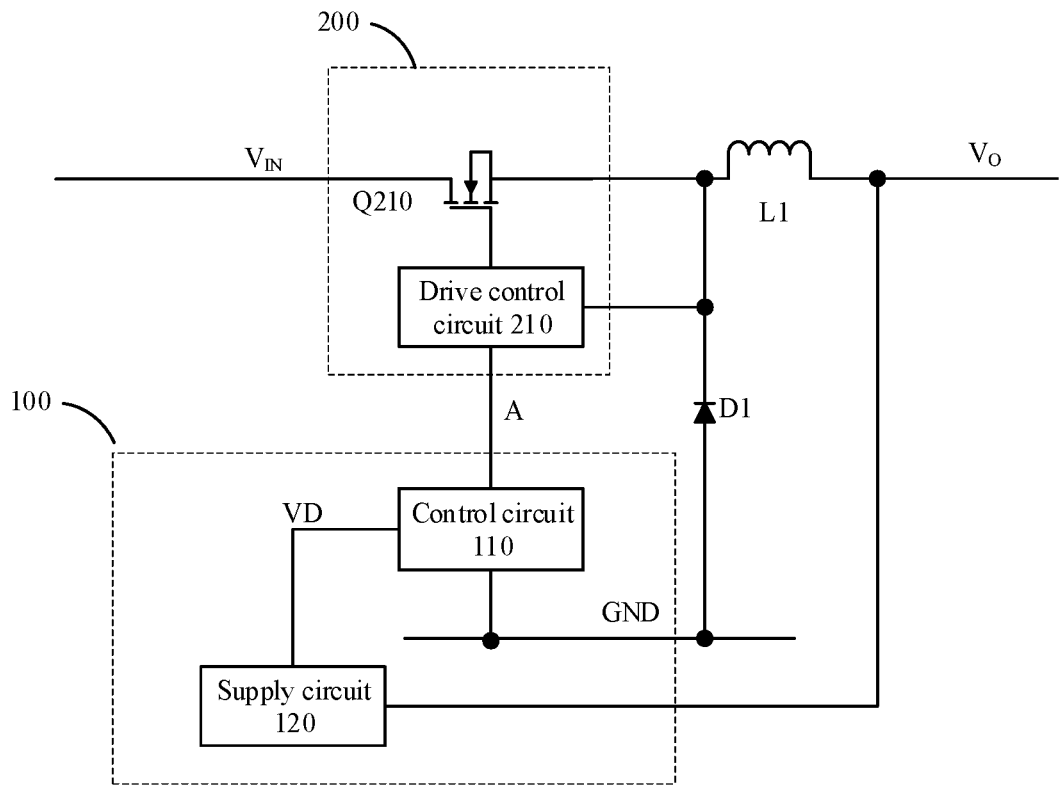
FIG. 3 is a schematic diagram of a dual-chip buck circuit using the supply method of the present invention.

In FIG. 3, the buck circuit is taken as an example to illustrate the dual-chip power circuit. The dual-chip power circuit is not limited to the buck circuit, but can be other types of switching power supply, such as buck-boost circuit.

As shown in FIG. 3, in one embodiment, the output end of the power circuit supplies power to the control circuit through the supply circuit 120. The input end of the supply circuit can be connected to other voltage sources that can supply power instead of being connected to the output end of the power circuit.

In one embodiment, in step S001, the power circuit operates at a maximum operating frequency or a limited operating frequency or a limited peak inductor current.

In one embodiment, in step S003, when the output voltage of the supply circuit is greater than the first threshold, the control circuit of the first chip sends a signal indicating the establishment of the output voltage of the supply circuit to the drive control circuit of the second chip. After receiving the signal indicating the establishment of the output voltage of the supply circuit, the drive control circuit begins to be controlled by the control circuit of the first chip. If the input voltage of the supply circuit is equal to the output voltage connected to the power circuit, when the output voltage of the power circuit is higher than a certain voltage value, the output voltage of the supply circuit 120 is sufficient to supply power to the control circuit. Therefore, when the input end of the supply circuit is connected to the output end of the power circuit, whether or not to send the signal indicating the establishment of the output voltage of the supply circuit is determined by judging the output voltage of the power circuit.

In one embodiment, in step S002, when the power circuit operates in the open-loop state for a longer time than the first time T1, or in step S003, when the power circuit operates in the closed-loop state, the output voltage of the supply circuit is lower than the second threshold V2, and the drive control circuit controls the power circuit to operate in the protection state. When the output voltage of the supply circuit is greater than the first threshold V1, the power circuit exits the protection state and then enters the closed-loop state.

The protection state is that the switching frequency of the power circuit is lower than the first switching frequency or that the power circuit stops switching for the second time, operates for the third time in the open-loop state, stops switching for the second time circularly.

In one embodiment, when the output voltage of the power circuit supplies power to the supply circuit 120, and when the power circuit operates in the open-loop state for a longer time than the first time T1, the output voltage of the supply circuit is maintained less than the first threshold V1, and at the same time, the output voltage of the power circuit may be short-circuited. Therefore, the power circuit needs to operate in the protection state. The protection state can be a low-frequency switching, such as the switching frequency reduced to 1 kHz, or a hiccup state, that is, operating for the third time in the open-loop state and then stopping switching for the second time circularly. In the protection state, some power passes from the input end to the output end of the power circuit. When the short circuit of the output voltage of the power circuit is relieved, the output voltage of the power circuit will be established, and the output voltage of the supply circuit will also be established. When the output voltage of the supply circuit is greater than the first threshold V1, the power circuit exits the protection state and enters the closed-loop state, that is, step S003.

In another case, when the output voltage of the power circuit supplies power to the supply circuit 120 and has already operated in step S003, but the output voltage of the power circuit is short-circuited, the power circuit also enters the protection state. Once the short circuit of the output voltage of the power circuit is relieved, the output voltage of the power circuit will be established, and the output voltage of the supply circuit will also be established. When the output voltage of the supply circuit is greater than the first threshold V1, the power circuit exits the protection state, enters the closed-loop state, and re-enters step S003.

The present invention further provides a dual-chip power circuit. The dual-chip power circuit includes the inductor L1, the conduction element, the first chip 100 and the second chip 200. The first chip 100 includes the control circuit 110 and the supply circuit 120. The second chip 200 includes the first switch Q210 and the drive control circuit 210, and the drive control circuit 210 is connected to the control end of the first switch Q210. The low voltage end of the output end of the power circuit is the reference ground of the control circuit of the first chip. The common end of the inductor and the conduction element is the reference ground of the drive control circuit of the second chip. When starting, the drive control circuit controls the power circuit to operate in an open-loop state, and when the output voltage of the supply circuit is greater than the first threshold, the supply circuit supplies power to the control circuit, the control circuit of the first chip receives the feedback signal, the drive control circuit of the second chip receives the output voltage of the first chip, and the power circuit operates in a closed-loop state.

As shown in FIG. 3, in one embodiment, the output end of the power circuit supplies power to the control circuit through the supply circuit 120. The input end of the supply circuit can be connected to other voltage sources that can supply power instead of being connected to the output end of the power circuit.

Figure 4:
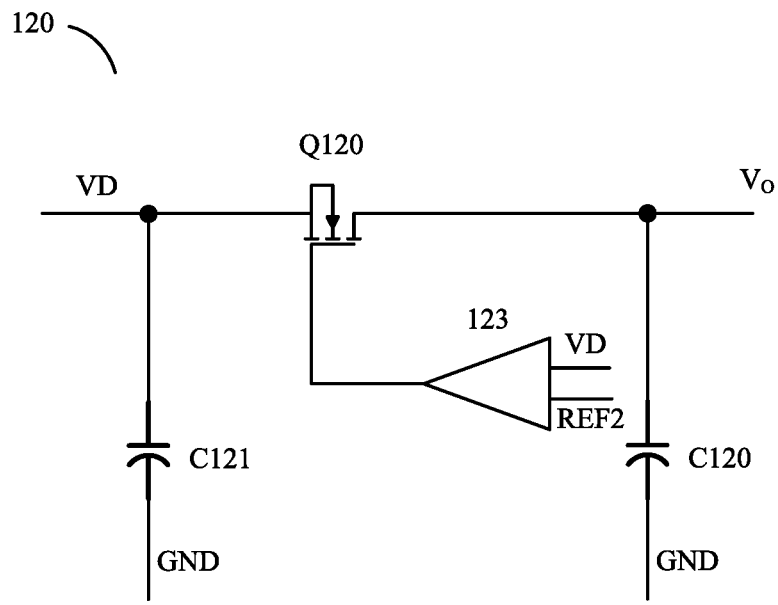
FIG. 4 is a schematic diagram of an implementation method of the supply circuit 120 of the present invention.

FIG. 4 shows an implementation method of the supply circuit 120. The supply circuit 120 connected to the output end of the power circuit is taken as an example. The output end Vo of the power circuit is connected to the first end of the high-voltage transistor Q120, the second end of the transistor Q120 is connected to the output end VD of the supply circuit, and the third end of the transistor Q120 is connected to the output end of the operational amplifier 123. The operational amplifier 123 adjusts the voltage of the third end of the transistor Q120 to make the output voltage of the supply circuit close to the reference voltage REF2. The output end VD of the supply circuit supplies power to the control circuit 110.

In one embodiment, in step S003, when the output voltage of the supply circuit is greater than the first threshold, the control circuit of the first chip sends a signal indicating the establishment of the output voltage of the supply circuit to the drive control circuit of the second chip. After receiving the signal indicating the establishment of the output voltage of the supply circuit, the drive control circuit begins to be controlled by the control circuit of the first chip. If the input voltage of the supply circuit is equal to the output voltage connected to the power circuit, when the output voltage of the power circuit is higher than a certain voltage value, the output voltage of the supply circuit 120 is sufficient to supply power to the control circuit. Therefore, when the input end of the supply circuit is connected to the output end of the power circuit, whether or not to send the signal indicating the establishment of the output voltage of the supply circuit is determined by judging the output voltage of the power circuit.

In one embodiment, the first chip receives the feedback signal, and the feedback signal indicates an output voltage, an output current, an output power, an input voltage, an input current or an input power.

Figure 5:
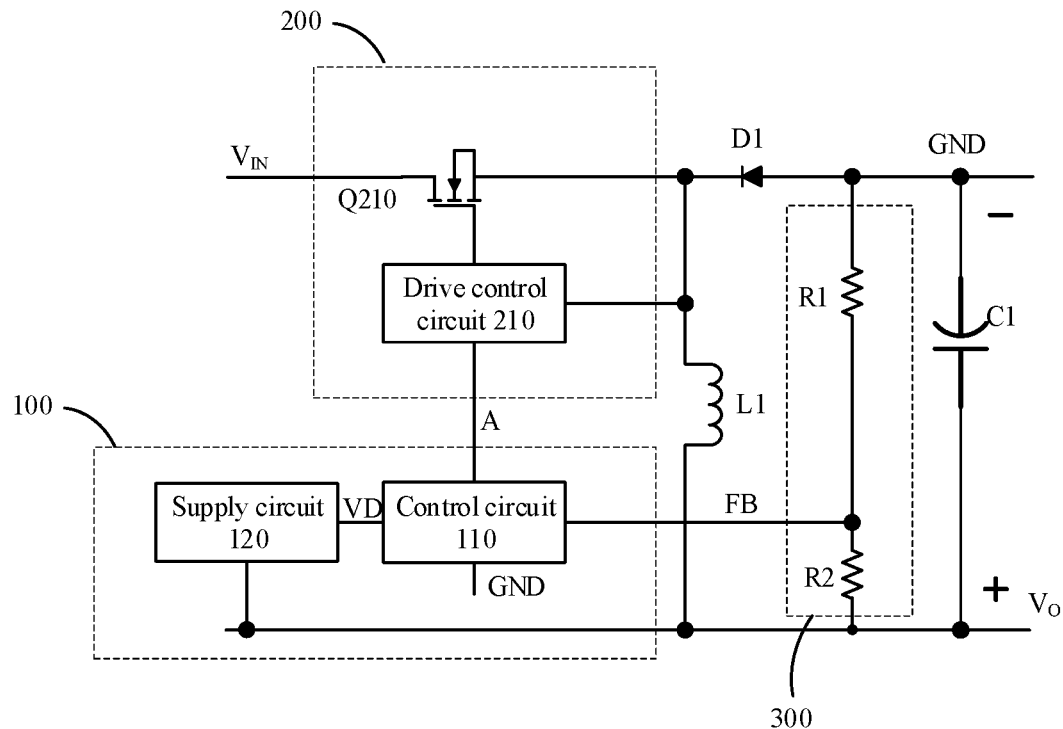
FIG. 5 is a schematic diagram of a dual-chip buck-boost circuit using the supply method of the present invention.

In one embodiment, as shown in FIG. 5, the power circuit is a buck-boost circuit. The input end of the power circuit is connected to the first end of the first switch of the second chip 200. In FIG. 5, the first switch adopts N-channel metal-oxide-semiconductor (NMOS). The first end of the first switch is the drain electrode of Q210. The second end of the first switch of the second chip is connected to the common end of the inductor and the conduction element. In FIG. 5, the first switch adopts NMOS, the second end of the first switch is the source electrode of Q210, and the inductor L1 is connected to the low voltage end of the input end of the power circuit, that is, the high voltage end of the output end of the power circuit. The first end of the conduction element is connected to the output end of the power circuit, and the second end of the conduction element is connected to the inductor. In FIG. 5, the conduction element is the diode D1, the first end of the conduction element is the anode of the diode D1, and the second end of the conduction element is the cathode of the diode D1.

The conduction element may also be a switch. When the conduction element is a second switch, the first chip is connected to the control electrode of the second switch to control the turn-on and turn-off of the second switch.

The feedback output voltage in the buck-boost circuit is taken as an example, as shown in FIG. 5, the power circuit further includes the output voltage sampling circuit 300. The output end of the power circuit is connected to the first chip 100 through the output voltage sampling circuit 300, the output voltage sampling circuit 300 samples the output voltage Vo of the power circuit and outputs the output voltage sampling value, and the feedback signal FB is the output voltage sampling value. In FIG. 5, the voltage divider composed of resistors is used for sampling. When the output voltage of the power circuit is lower than the voltage of the control circuit 110 of the first chip, the output voltage of the power circuit can be sampled directly without using the voltage sampling circuit, that is, the output voltage of the power circuit is directly received as the feedback signal FB. By sampling the output voltage of the power circuit, the output voltage of the power circuit remains stable.

If the output current is required to remain stable, the output current can be sampled. The output current can be directly or indirectly sampled. Taking directly sampling the output current as an example, the power circuit further includes an output current sampling circuit. The output current sampling circuit samples the output current and outputs the output current sampling value, the output current sampling circuit is connected to the first chip, and the feedback signal FB is the output current sampling value.

The input voltage can be directly or indirectly sampled to remain stable, and the input current can be directly or indirectly sampled to remain stable. The output power can be obtained by sampling the output voltage and the output current, and the stability of the output power can be achieved. The input power can be obtained by sampling the input voltage and the input current, and the stability of the input power can be achieved.

In one embodiment, as shown in FIG. 3, the power circuit is a buck circuit. The input end of the power circuit is connected to the first end of the first switch of the second chip. In FIG. 3, the first switch adopts NMOS. The first end of the first switch is the drain electrode of Q210. The second end of the first switch of the second chip is connected to the common end of the inductor and the conduction element. In FIG. 3, the first switch adopts NMOS, the second end of the first switch is the source electrode of Q210, and the inductor is connected to the output end of the power circuit. The first end of the conduction element is connected to the low voltage end of the input end of the power circuit, and the second end of the conduction element is connected to the inductor. In FIG. 3, the conduction element is the diode D1, the first end of the conduction element is the anode of the diode D1, and the second end of the conduction element is the cathode of the diode D1.

Figure 6:
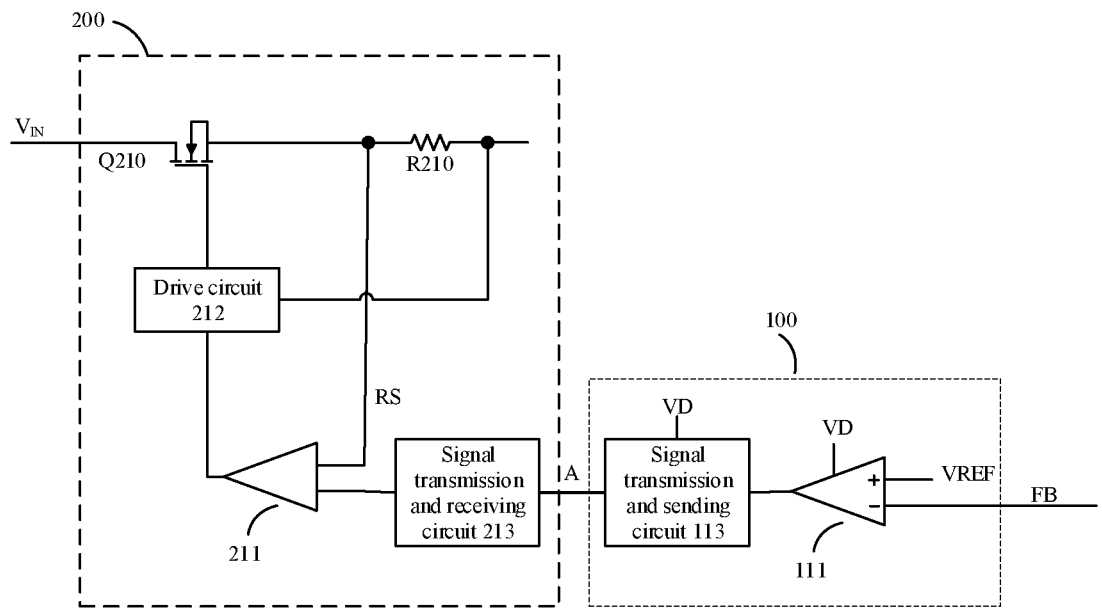
FIG. 6 is a schematic diagram of the circuit structures of the first chip and the second chip according to an embodiment of the present invention.

In one embodiment, as shown in FIG. 6, the control circuit 110 of the first chip includes the signal transmission and sending circuit 113. The drive control circuit 210 of the second chip includes the signal transmission and receiving circuit 213. The signal transmission and sending circuit converts the signal to be transmitted into the transmission signal A, and the signal transmission and receiving circuit 213 receives the transmission signal A and converts the transmission signal A into the first control signal. As shown in FIG. 6, the control circuit 110 includes the operational amplification circuit 111. The drive control circuit 210 includes the comparison circuit 211 and the drive circuit 212. The operational amplification circuit performs an operational amplification on the feedback signal FB to obtain the compensation signal COMP. The signal transmission and sending circuit 113 receives the compensation signal COMP. The comparison circuit 211 compares the current sampling value RS with the first control signal, and the drive circuit 212 drives the first switch Q210 according to the output voltage of the comparison circuit.

Taking the peak current control mode as an example, the first control signal indicates the peak inductor current and the pulse signal. When the first switch is turned on, the inductor current rises. When the current sampling value RS is greater than or equal to the peak inductor current, the output voltage of the comparison circuit 211 is inverted, the drive circuit 212 controls the first switch Q210 to be turned off, the inductor current decreases, and when the pulse signal changes from invalid to valid, the drive circuit 212 controls the first switch Q210 to be turned on.

Taking the valley current control mode as an example, the first control signal indicates the valley inductor current and the pulse signal. When the first switch is turned off, the inductor current decreases. When the current sampling value RS is less than or equal to the inductor current valley value, the output voltage of the comparison circuit 211 is inverted, and the drive circuit 212 controls the first switch Q210 to be turned on.

Taking the BANG-BANG control mode as an example, the first control signal indicates the peak inductor current and the valley inductor current. When the first switch is turned on, the inductor current rises. When the current sampling value RS is greater than or equal to the peak inductor current, the output voltage of the comparison circuit 211 is inverted, the drive circuit 212 controls the first switch Q210 to be turned off, and the inductor current decreases. When the current sampling value RS is less than or equal to the valley inductor current, the output voltage of the comparison circuit 211 is inverted, and the drive circuit 212 controls the first switch Q210 to be turned on.

Taking the constant on time control mode as an example, the first control signal indicates the on time and the pulse signal. When the first switch is turned on, the inductor current rises, and the timing circuit starts timing from the moment when the first switch is turned on. When the timing reaches the on time, the drive circuit 212 controls the first switch Q210 to be turned off, and the inductor current decreases. When the pulse signal changes from invalid to valid, the drive circuit 212 controls the first switch Q210 to be turned on.

The first control signal can also indicate the current limiting value. The comparison circuit compares the current sampling value with the current limiting value, and when the current sampling value is greater than the current limiting value, the drive circuit controls the first switch to be turned off.

Although the embodiments are separately illustrated and described above, the embodiments contain some common technologies. In the view of those skilled in the art, replacements and integrations between the embodiments may be performed. Any content not clearly recorded in one of the embodiments may be determined based on another embodiment where the content is recited.

The embodiments described above do not constitute a limitation on the protective scope of the technical solution of the present invention. Any modification, equivalent replacement, and improvement made within the spirit and principle of the above-mentioned embodiments shall fall within the protective scope of the technical solution of the present invention.

What is claimed is:

1. A supply method of a dual-chip power circuit, wherein, the dual-chip power circuit comprises an inductor, a conduction element, a first chip and a second chip; the first chip comprises a control circuit and a supply circuit; the second chip comprises a first switch and a drive control circuit, and the drive control circuit is connected to a control end of the first switch; a low voltage end of an output end of the dual-chip power circuit is a reference ground of the control circuit of the first chip; a common end of the inductor and the conduction element is a reference ground of the drive control circuit of the second chip; the supply method comprises the following steps:

S001: starting by controlling the dual-chip power circuit by the drive control circuit to operate in an open-loop state;

S002: detecting whether an output voltage of the supply circuit is greater than a first threshold; if the output voltage of the supply circuit is less than the first threshold, returning to step S001; if the output voltage of the supply circuit is greater than or equal to the first threshold, proceeding to step S003; and S003: when the output voltage of the supply circuit is greater than or equal to the first threshold, supplying power to the control circuit by the supply circuit, receiving an output voltage of the first chip by the drive control circuit of the second chip, and the dual-chip power circuit in a closed-loop state, wherein, in step S003, when the output voltage of the supply circuit is greater than the first threshold, the control circuit of the first chip sends a signal to the drive control circuit of the second chip; after receiving the signal, the drive control circuit begins to be controlled by the control circuit of the first chip, wherein the signal indicates an establishment of the output voltage of the supply circuit.

2. The supply method of the dual-chip power circuit according to claim 1, wherein, the output end of the dual-chip power circuit supplies the power to the control circuit through the supply circuit.

3. The supply method of the dual-chip power circuit according to claim 1, wherein, in step S001, the dual-chip power circuit operates at a maximum operating frequency, or a limited operating frequency or a limited peak inductor current.

4. The supply method of the dual-chip power circuit according to claim 1, wherein, in step S002, when the dual-chip power circuit operates in the open-loop state for a longer time than a first time, or in step S003, when the dual-chip power circuit operates in the closed-loop state, the output voltage of the supply circuit is lower than a second threshold, and the drive control circuit controls the dual-chip power circuit to operate in a protection state; when the output voltage of the supply circuit is greater than the first threshold, the dual-chip power circuit exits the protection state and then enters the closed-loop state.

5. The supply method of the dual-chip power circuit according to claim 4, wherein, the protection state comprises at least one of a first state and a second state; in the first state, a switching frequency of the dual-chip power circuit is lower than a first switching frequency; in the second state, the dual-chip power circuit stops switching for a second time, operates for a third time in the open-loop state, and stops switching for the second time circularly.

6. A dual-chip power circuit, comprising an inductor, a conduction element, a first chip and a second chip, wherein, the first chip comprises a control circuit and a supply circuit; the second chip comprises a first switch and a drive control circuit, and the drive control circuit is connected to a control end of the first switch; a low voltage end of an output end of the dual-chip power circuit is a reference ground of the control circuit of the first chip; a common end of the inductor and the conduction element is a reference ground of the drive control circuit of the second chip; wherein when starting, the drive control circuit controls the dual-chip power circuit to operate in an open-loop state, and wherein when an output voltage of the supply circuit is greater than a first threshold, the supply circuit supplies power to the control circuit, the control circuit of the first chip receives a feedback signal, the drive control circuit of the second chip receives an output voltage of the first chip, and the dual-chip power circuit operates in a closed-loop state, wherein, when the output voltage of the supply circuit is greater than the first threshold, the control circuit of the first chip sends a signal to the drive control circuit of the second chip; after receiving the signal, the drive control circuit begins to be controlled by the control circuit of the first chip, wherein the signal indicates an establishment of the output voltage of the supply circuit.

7. The dual-chip power circuit according to claim 6, wherein, the output end of the dual-chip power circuit supplies the power to the control circuit through the supply circuit.

8. The dual-chip power circuit according to claim 6, wherein, the first chip receives the feedback signal, and the feedback signal indicates at least one of an output voltage, an output current, an output power, an input voltage, an input current and an input power of the dual-chip power circuit.

9. The dual-chip power circuit according to claim 6, wherein, the dual-chip power circuit comprises at least one of a buck-boost circuit and a buck circuit;
  wherein when the dual-chip power circuit is the buck-boost circuit, an input end of the dual-chip power circuit is connected to a first end of the first switch of the second chip; a second end of the first switch of the second chip is connected to the common end of the inductor and the conduction element; the inductor is connected to a low voltage end of the input end of the dual-chip power circuit; a first end of the conduction element is connected to the output end of the dual-chip power circuit, and a second end of the conduction element is connected to the inductor;
  wherein when the dual-chip power circuit is the buck circuit, the input end of the dual-chip power circuit is connected to the first end of the first switch of the second chip; the second end of the first switch of the second chip is connected to the common end of the inductor and the conduction element; the inductor is connected to the output end of the dual-chip power circuit; the first end of the conduction element is connected to the low voltage end of the input end of the dual-chip power circuit, and the second end of the conduction element is connected to the inductor.

* * * * *